United States Patent
Bennett et al.

(10) Patent No.: US 10,626,314 B1
(45) Date of Patent: Apr. 21, 2020

(54) ADDITIVE FOR DRILLING FLUIDS

(71) Applicants: BYK—Chemie GmbH, Wesel (DE); BYK USA Inc., Wallingford, CT (US)

(72) Inventors: Richard William Bennett, Seguin, TX (US); Rene Nagelsdiek, Hamminkeln (DE)

(73) Assignees: BYK-Chemie, GmbH, Wesel (DE); BYK USA Inc., Wallingford, CT (US)

( * ) Notice: Subject to any disclaimer, the term of this patent is extended or adjusted under 35 U.S.C. 154(b) by 187 days.

(21) Appl. No.: 15/643,639

(22) Filed: Jul. 7, 2017

Related U.S. Application Data

(60) Provisional application No. 62/360,502, filed on Jul. 11, 2016.

(51) Int. Cl.
*C09K 8/035* (2006.01)
*C09K 8/36* (2006.01)
*C09K 8/03* (2006.01)

(52) U.S. Cl.
CPC .............. *C09K 8/035* (2013.01); *C09K 8/032* (2013.01); *C09K 8/36* (2013.01)

(58) Field of Classification Search
None
See application file for complete search history.

(56) References Cited

U.S. PATENT DOCUMENTS

| | | | |
|---|---|---|---|
| 2,994,660 A * | 8/1961 | Reddie | C09K 8/36 507/131 |
| 2,996,450 A * | 8/1961 | Zech | B01F 17/0042 507/110 |
| 3,642,623 A * | 2/1972 | Bennett | C09K 8/36 507/126 |
| 3,959,158 A | 5/1976 | Stanford et al. | |
| 4,473,675 A | 9/1984 | Knudson, Jr. et al. | |
| 4,569,923 A | 2/1986 | Knudson, Jr. et al. | |
| 4,644,842 A | 2/1987 | Aluisi | |
| 4,713,184 A * | 12/1987 | Zaid | C02F 5/14 507/236 |
| 4,849,006 A | 7/1989 | Knudson, Jr. | |
| 5,002,672 A | 5/1991 | Hayes et al. | |
| 5,110,501 A | 5/1992 | Knudson, Jr. et al. | |
| 5,160,454 A | 11/1992 | Knudson, Jr. et al. | |
| 5,248,641 A | 9/1993 | Bauer et al. | |
| 5,254,531 A | 10/1993 | Mueller et al. | |
| 5,266,538 A | 11/1993 | Knudson, Jr. et al. | |
| 5,391,228 A | 2/1995 | Carroll | |
| 5,593,953 A * | 1/1997 | Malchow, Jr. | C09K 8/36 507/134 |
| 5,663,111 A | 9/1997 | Gadberry et al. | |
| 5,700,319 A | 12/1997 | Bauer et al. | |
| 5,728,764 A | 3/1998 | Bauer et al. | |
| 5,739,087 A | 4/1998 | Dennis | |
| 5,780,376 A | 7/1998 | Gonzales et al. | |
| 5,785,749 A | 7/1998 | Knesek et al. | |
| 5,837,654 A | 11/1998 | Carroll et al. | |
| 5,989,331 A | 11/1999 | Bauer et al. | |
| 6,036,765 A | 3/2000 | Farrow et al. | |
| 6,172,121 B1 | 1/2001 | Chaiko | |
| 6,187,719 B1 * | 2/2001 | Dino | C01B 33/44 507/129 |
| 6,271,298 B1 | 8/2001 | Powell et al. | |
| 6,339,048 B1 | 1/2002 | Santhanam et al. | |
| 6,462,096 B1 | 10/2002 | Dino et al. | |
| 6,534,570 B2 | 3/2003 | Farrow et al. | |
| 6,635,108 B1 | 10/2003 | Farrow et al. | |
| 6,730,719 B2 | 5/2004 | Powell | |
| 6,787,592 B1 | 9/2004 | Powell et al. | |
| 6,849,680 B2 | 2/2005 | Knudson, Jr. et al. | |
| 6,861,393 B2 | 3/2005 | Temple et al. | |
| 6,890,502 B2 | 5/2005 | Bauer et al. | |
| 6,908,887 B2 | 6/2005 | Thaemlitz | |
| 7,125,825 B2 | 10/2006 | Moss | |
| 7,345,010 B2 | 3/2008 | Thompson et al. | |
| 7,354,967 B2 | 4/2008 | Fasulo et al. | |
| 7,799,742 B2 | 9/2010 | Dino | |
| 7,799,890 B2 | 9/2010 | Haubennestel et al. | |
| 7,834,126 B2 | 11/2010 | Haubennestel et al. | |
| 7,868,122 B2 | 1/2011 | Steinmetz et al. | |
| 7,871,962 B2 | 1/2011 | Patel et al. | |
| 7,939,470 B1 | 5/2011 | Wagle et al. | |
| 7,956,015 B2 | 6/2011 | Dino | |
| 8,138,125 B2 | 3/2012 | Dino | |
| 8,183,185 B2 | 5/2012 | Pakulski | |
| 8,809,240 B2 | 8/2014 | Dino | |
| 8,936,111 B2 | 1/2015 | Maghrabi et al. | |
| 9,127,192 B2 | 9/2015 | Maghrabi et al. | |
| 9,296,937 B2 | 3/2016 | Wagle et al. | |
| 2003/0130135 A1 | 7/2003 | Hou et al. | |
| 2004/0038829 A1 | 2/2004 | Thaemlitz | |
| 2004/0102332 A1 | 5/2004 | Thompson et al. | |
| 2004/0102585 A1 | 5/2004 | Steinmetz et al. | |
| 2005/0049147 A1 | 3/2005 | Patel et al. | |
| 2006/0199890 A1 | 9/2006 | Fasulo et al. | |
| 2007/0167333 A1 * | 7/2007 | Hurd | B01F 17/005 507/244 |
| 2007/0173417 A1 * | 7/2007 | Kaufman | C09K 8/524 507/269 |
| 2008/0194433 A1 | 8/2008 | Tehrani | |
| 2008/0318810 A1 | 12/2008 | Merli et al. | |
| 2009/0260885 A1 * | 10/2009 | Pomerleau | C09K 8/36 175/65 |
| 2009/0318595 A1 | 12/2009 | Steinmetz et al. | |

(Continued)

OTHER PUBLICATIONS

Bern, et al., Field Monitoring of Weight-Material Sag, 2010 American Association of Drilling Engineers Fluids Conference and Exhibition, Houston, Texas, United States of America.

(Continued)

*Primary Examiner* — John J Figueroa
(74) *Attorney, Agent, or Firm* — Curatolo Sidota Co, LPA; Joseph G. Curatolo; Salvatore A. Sidoti

(57) ABSTRACT

A drilling fluid for drilling gas or oil wells including: at least one oleaginous base fluid; at least one inorganic thixotropic agent; at least one of water or brine; at least one emulsifier; optionally at least one wetting agent; optionally at least one material which imparts alkalinity in the drilling fluid; optionally at least one weighting material; and a rheology modifying additive; wherein the rheology modifying additive, prior to addition to the drilling fluid, includes: (i) an amine salt of a trimer acid, the trimer acid having from about 30 to about 72 carbon atoms; and (ii) an amine salt of a monocarboxylic fatty acid, the monocarboxylic fatty acid having from about 6 to about 30 carbon atoms, optionally wherein the monocarboxylic fatty acid includes at least one of: (a) at least one saturated carboxylic; or (b) at least one unsaturated carboxylic acid.

22 Claims, No Drawings

(56) References Cited

U.S. PATENT DOCUMENTS

| | | | |
|---|---|---|---|
| 2012/0129735 A1 | 5/2012 | Dino et al. |
| 2012/0130013 A1 | 5/2012 | Issberner et al. |
| 2012/0288700 A1 | 11/2012 | McMullin et al. |
| 2012/0289437 A1 | 11/2012 | David et al. |
| 2012/0289635 A1 | 11/2012 | Bühne et al. |
| 2013/0303410 A1 | 11/2013 | Wagle et al. |
| 2013/0303411 A1 | 11/2013 | Wagle et al. |
| 2014/0296430 A1 | 10/2014 | Pritschins et al. |
| 2014/0312280 A1 | 10/2014 | Pritschins et al. |
| 2015/0014062 A1 | 1/2015 | Napierala et al. |
| 2015/0024975 A1 | 1/2015 | Wagle et al. |
| 2015/0038641 A1 | 2/2015 | Göbelt et al. |
| 2015/0041138 A1 | 2/2015 | Badel et al. |
| 2015/0152211 A1 | 6/2015 | Göbelt et al. |
| 2015/0159075 A1 | 6/2015 | Harris et al. |
| 2015/0203619 A1 | 7/2015 | Nagelsdiek et al. |
| 2015/0376490 A1 | 12/2015 | Dino et al. |

OTHER PUBLICATIONS

Zamora, Taming of the Shoe, 2011 American Association of Drilling Engineers National Technical Conference and Exhibition, Houston, Texas, United Slates of America.

American Petroleum Institute, API Recommended Practice 13B-2, Recommended Practice for Field Testing Oil-Based Drilling Fluids, $5^{th}$ Edition, Apr. 2014.

Rheological Additives based on Urea Compounds, preferably Urea Urethanes, in Gas and Oilfield Applications, Research Disclosure, Aug. 11, 2015.

Strycek. et al., Influence of Polycarboxylates on Rheological Properties of Sealing Slurries, The International Journal of Transport & Logistics. 2010.

* cited by examiner

ADDITIVE FOR DRILLING FLUIDS

This application claims the benefit of the filing date under 35 U.S.C. § 119(e) from U.S. Provisional Patent Application Ser. No. 62/360,502, filed on Jul. 11, 2016.

Provided is an additive for drilling fluids, such as non-aqueous drilling fluids, and methods of controlling and/or modifying the properties of such drilling fluids by incorporating the additive therein.

Drilling fluids, also known as circulating fluids, are used in rotary drilling of geological formations containing hydrocarbons. Drilling fluids may also be used in rotary drilling of geological formations containing other materials, such as water. There are three main categories of drilling fluids: water-based drilling fluids; non-aqueous or oil-based drilling fluids; and gaseous drilling fluids. Drilling fluids may also be known as "drilling muds". The focus of the present subject matter is upon non-aqueous/oil-based drilling fluids; for simplicity, use of the terms "drilling fluid" or "drilling fluids" hereinafter refers to non-aqueous/oil-based drilling fluids, unless specified otherwise. However, it is contemplated that the present subject matter may be useful with other drilling fluids.

In the course of drilling an oil, gas, water or other well by means of rotary drilling tools, the drill pipe and bit are rotated to drill out the borehole. Drilling fluids are circulated downwardly through the hollow drill stem pipe and bit nozzles to the bottom of the borehole and then flow back up the well to the surface through the annular space between the drill stem pipe and the interior of the borehole (the walls of the wellbore). Drilling fluids comprise suspensions of solid material in a liquid medium and may contain other added agents. As a drilling fluid flows back up the wellbore, it carries drill cuttings, which are removed before recirculation and reuse of the drilling fluid. The drilling fluid lubricates and cools the drill bit, and suspends and carries cuttings out of the borehole. In order to perform these and other functions the drilling fluid should desirably have certain physical characteristics. These include a shear-thinning viscosity that enables it to be pumped and circulated. The fluid should also have sufficient gel strength, such that cuttings will remain suspended in the borehole if circulation of the fluid pumping is stopped, as for example by a mechanical failure. The drilling fluid performs a number of additional functions, including: providing hydrostatic pressure; supporting the weight of the drill pipe and/or casing; coating the wellbore surface to prevent leakage and/or at least partial collapse of the wellbore; and preventing flow of material into or out of the wellbore.

Drilling fluids relevant to the present subject matter may comprise some or all of the following: a base fluid, such as a petroleum oil or synthetic oil; at least one thixotropic agent, such as organoclay material; water and/or brine; at least one emulsifier; at least one material which imparts alkalinity in the drilling fluid; at least one weighting material; and/or at least one additive, such as rheology modifiers.

The base fluid (continuous phase) of the drilling fluid may be derived from petroleum, for example, diesel oil, mineral seal oil, kerosene, fuel oil, white oil, crude oil, and the like. Specific examples include number 2 diesel oil and mineral oil. The base fluid may also be derived synthetically, for example, olefins (e.g., alpha or internal) or fluids derived from gas-to-liquid methods, such as the Fischer-Tropsch process. The base fluid may further include natural oils, such as vegetable oil, canola oil, palm oil, or coconut oil. Combinations of more than one of any of these base fluids may also be used in order to meet certain technical and/or environmental specifications. In certain embodiments, the base fluid may comprise a fluid having a high flash point and/or a low kinematic viscosity.

In certain embodiments, such as embodiments in which the drilling fluid may be subjected to high temperatures, the base fluid may be environmentally benign, meaning that the base fluid is one which, over a reasonable course of time, will biodegrade into relatively harmless materials. Oils of this type are known for use in drilling fluids and similar applications, and are commonly hydrotreated light distillate. The resultant product contains minimal, if any, quantities of aromatic components, and mostly short chain hydrocarbons. The LVT® oil of Calumet Penrico, LLC, and the Low Toxicity Drilling Mud Oil of ExxonMobil, such as those based on ESCAID™ fluids, are commercial examples of such products. Synthesized biodegradable oils based on alpha or internal olefins or the like are also acceptable for use as a base fluid, such as AMODRILL® olefin fluid by INEOS USA, LLC, as well as ODC® high purity hydrocarbons of Sasol North America, Inc.

If water is used in the drilling fluid, the amount may be small. When water is intentionally included as a component of a drilling fluid, the fluid may be known as an invert emulsion. Invert emulsion drilling fluids may be formulated with an oil/water volume ratio ("OWR") of about 95/5 to about 40/60, such as about 75/25 OWR, with water as the aqueous internal phase. The water of the aqueous internal phase may typically be in the form of brine, which provides salt, such as calcium chloride, for osmotic shale stability. In certain embodiments, replacing some of the base fluid with water/brine may reduce the overall cost of the drilling fluid.

Drilling fluids may comprise a number of conventional additives known to be used in drilling fluids, to provide particular desired application properties. In certain embodiments, the drilling fluid may comprise, at least one thixotropic agent, at least one emulsifier, such as a primary emulsifier and a secondary emulsifier, a wetting agent, an acid gas scavenger, a weighting agent, a fluid loss control additive, a bridging agent, an alkalinity control agent, a material that imparts alkalinity, a non-clay rheological additive, and/or a corrosion inhibitor.

Water soluble salts may be added to the drilling fluid, and may include halides of the alkali and alkaline earth metal groups, such as brine salts, which may include sodium chloride, potassium chloride, sodium bromide, calcium chloride, and the like, optionally in a water solution. Formation brines and seawater may also be used. Salts may be added to control the osmotic pressure of the formulations as needed, according to drilling conditions, which may at least partially stabilize the geological formation. Alternatively or additionally, other hygroscopic materials, such as glycols, glycerols and the like, may be used in an aqueous solution similarly to the water soluble salts.

Emulsifiers or emulsifier systems (such as primary and secondary emulsifiers) may form or stabilize the invert emulsion, and/or may serve as wetting agents for solids. Surfactants may be used in the drilling fluids, for emulsifying the aqueous phase and/or as wetting agents for the solid phase(s), and may include alkali and alkaline earth metal salts of fatty acids, fatty acid derivatives, rosin acids, tall oil acids, or synthetic emulsifiers such as alkyl aromatic sulfonates, aromatic alkyl sulfonates, long chain sulfates, oxidized tall oils, carboxylated 2-alkyl imidazolines, imidazoline salts, amido amines, amide-imidoamines, alkoxy phenols, polyalkoxy alcohols, alkyl phenols, ether carboxylates, lecithins, high molecular weight alcohols, polymer surfactants and the like.

Weighting materials, if used in the drilling fluids, may include such materials as calcium carbonate, silicates, clays, barites, specular hematite, iron ores, siderite, ilmenite, galena, and the like. Weighting agents may be used to balance or adjust drilling fluid density and/or hydrostatic pressure, such as downhole pressure, to prevent fluids from entering the wellbore from the geological formation.

Thixotropic agents (which impart thickening and gelling properties) used in drilling fluids may include organophilic phyllosilicates (hereinafter referred to as "organoclays"). The organoclays used may be any of those which have substantial base-exchange capacity. Examples of such organoclays include bentonite (such as swelling bentonite), montmorillonite, hectorite, attapulgite, illite, Fuller's earth, beidellite, saponite, sepiolite, vermiculite, zeolites, and the like. Exemplary materials based on bentonites are available from BYK Additives Inc. under the trade name CLAY-TONE®. A particular example of a mixture of organoclays is GARAMITE®, available from BYK Additives Inc. Organoclays may impart one or more of the following properties on drilling fluids: thickening, gelling, suspension, wellbore-cleaning, etc.

To obtain the desired organoclays, a mineral clay or a mixture of mineral clays, such as swelling bentonite and/or hectorite, may be treated or reacted with functional organic compounds, as is well known to those skilled in the art. The amount of organic compound used will be dependent on the reactivity of the clay(s) used, but may be from about 20 to 300 milliequivalents of a surfactant, such as an organic ammonium or phosphonium salt, for example, per 100 grams of clay. The reactions may be conducted in water and the treated clay may be separated and dried.

More generally, organoclays may be prepared by wet or dry processes, which may depend on the desired end-use, and/or the amount and/or type of surfactant treatment. Wet-processed organoclays may yield faster and have greater thermal stability than dry-processed organoclays, because inert materials are removed and surface treatment of the wet-processed organoclays may be more complete.

Suitable clays may be exchanged with quaternary ammonium species and/or alkoxylated quaternary amine species, such as by using salts of such species. Suitable quaternary ammonium cations and/or alkoxylated quaternary amine cations of these salts may include at least one of trimethyl octadecyl ammonium, methyl benzyl dicoco ammonium, methyl trihydrogenated tallow ammonium, dimethyl bis [hydrogenated tallow] ammonium, benzyl dimethyl hydrogenated tallow ammonium, trimethyl hydrogenated tallow ammonium, methyl benzyl bis[hydrogenated tallow] ammonium, methyl bis(2-hydroxyethyl[cocoalkyl] ammonium, or the like. Suitable anions of these salts may include organic and/or inorganic anions, such as at least one of chloride, bromide, iodide, sulfate, hydroxide, methyl sulfate, phosphate, phosphinate, nitrate, or acetate. Such clay exchange processes and methods are described in U.S. Pat. No. 6,172,121 B1.

The organoclay content of the drilling fluid may vary inversely to the density of the drilling fluid. The organoclay content may range from about 25 to about 30 pounds per barrel ("ppb" or "lb/bbl") in low density drilling fluids, to almost 0 in high density drilling fluids. In certain embodiments, an amount from about 2 to about 15 pounds of organoclay per barrel of drilling fluid will be used. In certain embodiments, an amount from about 3 to about 10 pounds of organoclay per barrel of drilling fluid will be used. In certain embodiments, the organoclay(s) is added to the drilling fluid in an amount effective to achieve a yield point of about 8 to about 35 pounds per 100 square feet. The degree of suspension or hole cleaning required or desired will have an impact on the clay concentration, as is well known to those skilled in the art.

Other additives may be included in the drilling fluid, such as fluid loss prevention additives and bridging agents. An acid gas scavenger, such as lime ($Ca(OH)_2$) may be added to the drilling fluid, and may react with some emulsifiers and/or with gases such as $H_2S$ during drilling.

The properties and composition(s) of drilling fluids may be complex and variable, based upon the required and/or desired properties, and results to be achieved. Some of the most important requirements of drilling fluids are that they be thermally stable and provide adequate rheology control under drilling conditions. These properties can be controlled, at least in part, by including organoclays in the drilling fluid. Large amounts of organoclays may be needed to obtain the desired thixotropic properties of the drilling fluid. Incorporation of organoclays into the drilling fluid imparts shear thinning properties to the drilling fluid, in that the drilling fluids will exhibit lower viscosities at higher shear rates.

Organoclays also impart gel strength to the drilling fluid, in that the drilling fluid will behave similarly to a gel at low or zero shear forces, which allows the drilling fluid to suspend drill cuttings and/or weighting agents (described below) under static conditions. Static conditions occur when the drilling fluid is not being pumped in order to allow for other drilling or rig operations to be performed, such as making a connection to the drill shaft or pipe, or changing tools. The drilling fluid density/hydrostatic pressure may be adjusted with weighting agents, such as barite, to prevent fluids from entering the wellbore from the geological formation. These are important properties of the drilling fluid which assist in the drilling process as described above.

Rheology modifiers have been used to alter the thixotropic properties of drilling fluids, in order to increase the yield point and/or low shear viscosity (6 rpm values) of the drilling fluids, without significantly altering the plastic viscosity of the drilling fluids. Inclusion of rheology modifiers may also allow for inclusion of smaller amounts of organoclays in the drilling fluid, while maintaining or improving the desired physical properties of the drilling fluids. The yield point of a drilling fluid is the amount of stress (force) necessary to cause the fluid to begin to flow.

Conventional rheology modifiers may lack thermal stability, and their degradation products may be deleterious to the drilling fluids. Examples of conventional rheology modifiers include simple fatty acids and dimer/trimer fatty acids. Simple fatty acids, such as stearic acid, may provide a short boost to yield point, but may also cause a decrease in performance at higher temperatures (e.g. 200° F.). Dimer/trimer fatty acids may be overly viscous, and therefore difficult to pour.

There remains a need for drilling fluid additives which adequately maintain or increase the yield point of the drilling fluid at similar or lower organoclay amounts, without causing undesirable side effects in the drilling fluid, such as undesirably altering the plastic viscosity of the drilling fluid.

Therefore, provided is a rheology modifying additive for drilling fluids which, prior to addition to a drilling fluid, comprises: (i) an amine salt of a trimer acid, the trimer acid having from about 30 to about 72 carbon atoms; and (ii) an amine salt of a monocarboxylic fatty acid, the monocarboxylic fatty acid having from about 6 to about 30 carbon atoms. In certain embodiments, the monocarboxylic fatty acid may comprise at least one of: (i) at least one saturated carboxylic acid; or (ii) at least one unsaturated carboxylic acid.

In certain embodiments, the subject rheology modifying additive may alter the rheology of drilling fluids such that the yield point and low shear viscosity are increased, without substantially altering the plastic viscosity of the drilling fluid. For example, it may be desired when using the subject rheology modifying additive in drilling fluids to increase the yield point and 6 rpm reading (as described below), without causing a significant increase in the plastic viscosity or excessive gel strength.

The subject rheology modifying additive has been found to perform better than conventional additives for modifying rheology of drilling fluids, such as: dimer/trimer fatty acid; polymerized, oxidized tall oil; oleic acid; and stearic acid.

In certain embodiments, the subject rheology modifying additive may be combined with at least one carrier and/or solvent, in order to provide a formulation which may be more efficiently added to a drilling fluid. Such carriers/solvents may include at least one of aliphatic hydrocarbons, aromatic hydrocarbons, araliphatic hydrocarbons, aliphatic alcohols, aromatic alcohols, araliphatic alcohols, or glycols. In certain embodiments, such carriers/solvents include at least one of diesel oil, mineral oil or synthetic oils. Other materials may be added to such formulations in order to improve storage properties, pourability, or other properties. For example, glycol ethers, propylene carbonate, and/or ethanol (among other materials) may be used to increase the pourability of the additive formulation. Furthermore, the ratio of active material to solvent in the additive formulation may be tailored to modify the pourability of the formulation, or to reduce the cost of the formulation while providing the same advantages to drilling fluids.

The subject rheology modifying additive may be added to a drilling fluid at any point during manufacture of the drilling fluid, or even after the drilling fluid has been injected into a wellbore or during recycling of the drilling fluid; the order of addition of the subject rheology modifying additive to a drilling fluid may not be critical in many circumstances. Drilling fluids may be recycled for economy and to minimize environmental impact, and it may be necessary to add additional additives to the drilling fluid during the recycling process to maintain desirable properties of the drilling fluid.

In certain embodiments, the subject rheology modifying additive may be added to drilling fluids which contain organoclays. In certain embodiments, the subject rheology modifying additive may be added to the drilling fluid after the organoclays have dispersed in the drilling fluid, and have at least begun to exfoliate. In embodiments in which the subject rheology modifying additive is added to organoclay-containing drilling fluid during manufacture of the drilling fluid at a manufacturing facility (sometimes referred to as a "liquid mud plant"), the subject rheology modifying additive may reduce the time and/or sheer requirements of the organoclay to yield. This may be particularly beneficial in circumstances in which the manufacturing facility operates at lower shear forces. In certain embodiments, the subject rheology modifying additive may be added to an organoclay during or after manufacture of the organoclay.

In certain embodiments, the subject rheology modifying additive may be used in manufacturing super-viscous drilling fluids which may optionally be used to clean out the drill pipe and/or the borehole before, during, and/or after drilling operations; such fluids may be referred to in the industry as "viscous pills" or "viscous sweeps". The subject rheology modifying additive may allow for more quickly preparing such fluids.

Depending on the base fluid, the temperature of the drilling fluid, and/or the emulsifier(s) used, drilling fluids including organoclays may require temperature and shear (e.g., high shear) to fully yield. This may cause challenges in drilling fluid manufacturing facilities which do not have the capability to produce high shear forces or sufficient temperature increases. In certain embodiments, in which the drilling fluid includes weighting materials, the drilling fluid may not possess enough suspension capacity, and may experience settling (e.g., barite settling, when barite is used as the weighting agent), which may be exacerbated during transport. The subject rheology modifying additive may mitigate these problems by increasing the low shear viscosity of drilling fluids.

In certain embodiments, provided are drilling fluids for drilling gas or oil wells comprising: at least one oleaginous base fluid; at least one inorganic thixotropic agent; at least one of water or brine; at least one emulsifier; optionally at least one wetting agent; optionally at least one material which imparts alkalinity in the drilling fluid; optionally at least one weighting material; and a rheology modifying additive; wherein the rheology modifying additive, prior to addition to the drilling fluid, comprises: (i) an amine salt of a trimer acid, the trimer acid having from about 30 to about 72 carbon atoms; and (ii) an amine salt of a monocarboxylic fatty acid, the monocarboxylic fatty acid having from about 6 to about 30 carbon atoms.

In certain embodiments, when the drilling fluid is subjected to hot rolling at 250° F. for 16 hours, followed by cooling to room temperature, and then is subjected to viscosity testing at 120° F. and/or 150° F., the drilling fluid with at least about 0.25 lb/bbl of the rheology modifying additive may exhibit at least one of the following properties, when compared to the drilling fluid without the rheology modifying additive: (1) an increase in yield point of at least about 25%, or optionally at least about 30%, or further optionally at least about 40%, or further optionally at least about 50%; or (2) an increase in 6 rpm dial reading of at least about 25%, or optionally at least about 30%, or further optionally at least about 40%, or further optionally at least about 50%, or further optionally at least about 75%, or further optionally at least about 100%.

In certain embodiments, the trimer acid may have from about 36 to about 72 carbon atoms, or optionally from about 36 to about 66 carbon atoms, or further optionally from about 42 to about 60 carbon atoms, or further optionally from about 48 to about 54 carbon atoms.

In certain embodiments, the trimer acid may comprise at least one of trimers of hexadecatrienoic acid, α-linolenic acid, rumelenic acid, stearidonic acid, α-parinaric acid, β-parinaric acid, eicosatrienoic acid, eicosatetraenoic acid, eicosapentaenoic acid, heneicosapentaenoic acid, docosapentaenoic acid, docosahexaenoic acid, tetracosapentaenoic acid, tetracosahexaenoic acid (nisinic acid), α-eleostearic acid, β-eleostearic acid, catalpic acid, punicic acid, linoleic acid, 10E,12Z-octadeca-9,11-dienoic acid, γ-linolenic acid, pinolenic acid, α-calendic acid, β-calendic acid, jacaric acid, eicosadienoic acid, dihomo-γ-linolenic acid, podocarpic acid, arachidonic acid, bosseopentaenoic acid, docosadienoic acid, docosatetraenoic acid, docosapentaenoic acid, tetracosatetraenoic acid, tetracosapentaenoic acid, 5-dodecenoic acid, 7-tetradecenoic acid, palmitoleic acid, vaccenic acid, rumenic acid, paullinic acid, 15-docosenoic acid, 17-tetracosenoic acid, oleic acid, talloil fatty acid, elaidic acid, gondoic acid, mead acid, erucic acid, nervonic acid, myristoleic acid, sapienic acid, or combinations thereof.

In certain embodiments, the monocarboxylic fatty acid may comprise at least one of: (i) at least one saturated carboxylic; or (ii) at least one unsaturated carboxylic acid. In certain embodiments, the monocarboxylic fatty acid has from about 8 to about 26 carbon atoms, or optionally from about 12 to about 20 carbon atoms, or further optionally from about 16 to about 18 carbon atoms.

In certain embodiments, the monocarboxylic fatty acid may be a tall oil fatty acid having from about 16 to about 22 carbon atoms, or optionally from about 16 to about 20 carbon atoms, or further optionally from about 16 to about 18 carbon atoms.

In certain embodiments, the monocarboxylic fatty acid may comprise at least one of myristoleic acid, sapienic acid, linoleic acid, linoelaidic acid, α-linolenic acid, docosahexaenoic acid, abietic acid, pimaric acid, tall oil fatty acid, caprylic acid, pelargonic acid, capric acid, undecylic acid, lauric acid, tridecylic acid, myristic acid, pentadecylic acid, palmitic acid, margaric acid, stearic acid, nonadecylic acid, arachidic acid, heneicosylic acid, behenic acid, tricosylic acid, lignoceric acid, pentacosylic acid, cerotic acid, hexadecatrienoic acid, α-linolenic acid, rumelenic acid, stearidonic acid, α-parinaric acid, β-parinaric acid, eicosatrienoic acid, eicosatetraenoic acid, eicosapentaenoic acid, heneicosapentaenoic acid, docosapentaenoic acid, docosahexaenoic acid, tetracosapentaenoic acid, tetracosahexaenoic acid (nisinic acid), α-eleostearic acid, β-eleostearic acid, catalpic acid, punicic acid, linoleic acid, 10E,12Z-octadeca-9,11-dienoic acid, γ-linolenic acid, pinolenic acid, α-calendic acid, β-calendic acid, jacaric acid, eicosadienoic acid, dihomo-γ-linolenic acid, podocarpic acid, arachidonic acid, bosseopentaenoic acid, docosadienoic acid, docosatetraenoic acid, docosapentaenoic acid, tetracosatetraenoic acid, tetracosapentaenoic acid, 5-dodecenoic acid, 7-tetradecenoic acid, palmitoleic acid, vaccenic acid, rumenic acid, paullinic acid, 15-docosenoic acid, 17-tetracosenoic acid, oleic acid, elaidic acid, gondoic acid, mead acid, erucic acid, or nervonic acid.

In certain embodiments, the amine of the rheology modifying additive component (i) and/or component (ii) may be a saturated or unsaturated monoamine having from about 3 to about 90 carbon atoms, or optionally from about 3 to about 54 carbon atoms, or further optionally from about 8 to about 37 carbon atoms, or further optionally from about 10 to about 24 carbon atoms, or further optionally from about 14 to about 20 carbon atoms. In certain embodiments, the amine of the rheology modifying additive component (i) and component (ii) are the same.

In certain embodiments, the amine of the rheology modifying additive component (i) and component (ii) are different. In these embodiments, transsalinization (i.e., ion exchange) may occur between the component (i) and the component (ii) in situ.

In certain embodiments, the amine may comprise a monoamine of the general formula (I):

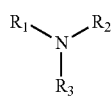
(I)

wherein:

$R_1$ represents a saturated or unsaturated, linear or branched hydrocarbon group having from about 1 to about 30 carbon atoms, or optionally from about 6 to about 24 carbon atoms, or further optionally from about 8 to about 22 carbon atoms; and $R_2$ and $R_3$ are the same or different from each other and $R_1$, and represent hydrogen or saturated or unsaturated, linear or branched hydrocarbon groups having from about 1 to about 30 carbon atoms, or optionally from about 6 to about 24 carbon atoms, or further optionally from about 8 to about 22 carbon atoms, or further optionally from about 1 to about 7 carbon atoms, or further optionally from about 1 to about 4 carbon atoms, or further optionally from about 1 to about 2 carbon atoms.

In certain embodiments, the amine may comprise a monoamine of general formula (I) in which $R_1$ represents a saturated or unsaturated, linear or branched hydrocarbon group having from about 12 to about 20 carbon atoms, and $R_2$ and $R_3$ represent hydrogen.

In certain embodiments, the amine may comprise at least one of n-propylamine, isopropylamine, n-butylamine, isobutylamine, amylamine, n-pentylamine, isopentylamine, hexylamine, 2-ethylhexylamine, octyl-amine, 6-methyl-2-heptaneamine, neopentylamine, decyl-amine, tridecylamine, octadecylamine, oleylamine, cocoyl amine, stearyl amine, tallo amine, soya amine, or mixtures of $C_8$-$C_{22}$ alkylamines.

In certain embodiments, the weight ratio of the rheology modifying additive component (i):component (ii) is from about 95:5 to about 5:95, or optionally from about 90:10 to about 10:90, or further optionally from about 80:20 to about 30:70, or further optionally from about 70:30 to about 50:50, or further optionally from about 65:35 to about 55:45.

In certain embodiments, the rheology modifying additive may further comprise at least one additional material, such as at least one carrier and/or at least one solvent. In certain embodiments, the at least one additional material may comprise at least one of aliphatic hydrocarbons, aromatic hydrocarbons, araliphatic hydrocarbons, aliphatic alcohols, aromatic alcohols, araliphatic alcohols, glycols, glycol ethers, or alkylene carbonates. In certain embodiments, the hydrocarbon(s) may comprise at least one of diesel oil, mineral oil, or synthetic oil. In certain embodiments, the alcohol(s) may comprise at least one alkanol, such as ethanol. In certain embodiments, the alkylene carbonate(s) may comprise at least one of ethylene carbonate, propylene carbonate, or glycerine carbonate.

In certain embodiments, the rheology modifying additive may be present in the drilling fluid in an amount of from about 0.5 to about 6 lb/bbl, or optionally from about 0.5 to about 4 lb/bbl, or further optionally from about 0.5 to about 2 lb/bbl, or further optionally from about 0.5 to about 1.5 lb/bbl.

In certain embodiments, the at least one oleaginous base fluid may comprise at least one of diesel oil, mineral seal oil, kerosene, fuel oil, white oil, or crude oil.

In certain embodiments, the at least one inorganic thixotropic agent may comprise at least one organoclay of bentonite, montmorillonite, hectorite, attapulgite, illite, Fuller's earth, beidellite, saponite, sepiolite, vermiculite, or zeolites, optionally wherein the at least one organoclay is treated with at least one of: (i) at least one quaternary ammonium compound; or (ii) at least one phosphonium compound. In certain embodiments, the at least one inorganic thixotropic agent may be treated with from about 10% to about 60% based on the mineral weight of a quaternary ammonium compound or mixtures thereof or phosphonium compounds or mixtures thereof or mixtures of quaternary ammonium compounds and phosphonium compounds. In certain embodiments, the quaternary ammonium compounds and/or the phosphonium compounds may comprise at least one of di-methyl-di(hydrogenated)tallow ammonium chloride, methyl-benzyl-di(hydrogenated)tallow ammonium chloride, di-methyl-benzyl-(hydrogenated)tallow ammonium chloride, dimethyl bis[hydrogenated tallow] ammonium chloride (2M2HT), methyl tris[hydrogenated tallow alkyl]chloride (M3HT), methyl bis(polyoxyethylene [15])cocoalkyl quaternary ammonium chloride, methyl bis(polyoxyethylene [15])oleyl quaternary ammonium chloride, methyl bis(polyoxyethylene [15])octadecyl quaternary ammonium chloride, or octyldecylmethyl (polyoxyethylene [15]) quaternary ammonium chloride (the numbers in brackets refer to the total number of ethylene oxide units).

In certain embodiments, the brine may comprise at least one halide of alkali or alkaline earth metals. In certain embodiments, the brine may comprise at least one of a formation brine; seawater; or an aqueous solution of at least one of sodium chloride, potassium chloride, sodium bromide, calcium chloride, glycols, glycerols, or formates.

In certain embodiments, the at least one emulsifier or optional wetting agent may comprise at least one of alkali or alkaline earth metal salts of fatty acids, fatty acid derivatives, rosin acids, tall oil acids, synthetic emulsifiers, alkyl aromatic sulfonates, aromatic alkyl sulfonates, long chain sulfates, oxidized tall oils, carboxylated 2-alkyl imidazolines, imidazoline salts, amido amines, amide-imidoamines, alkoxy phenols, polyalkoxy alcohols, alkyl phenols, ether carboxylates, lecithins, high molecular weight alcohols, or polymer surfactants.

In certain embodiments, the at least one material which imparts alkalinity may comprise at least one of alkaline carbonates, alkaline oxides, or alkaline hydroxides, optionally wherein the at least one material which imparts alkalinity comprises lime. In certain embodiments, the at least one material which imparts alkalinity may be present in the drilling fluid in an amount of at least about 0.25 lb/bbl, or optionally from about 0.25 to about 10 lb/bbl, or further optionally from about 2 to about 10 lb/bbl.

In certain embodiments, the at least one weighting material may comprise at least one of calcium carbonate, silicates, clays, barites, specular hematite, iron ores, siderite, ilmenite, or galena. In certain embodiments, the weighting material may be micronized to improve flow properties of the drilling fluid and/or reduce sag in the drilling fluid.

Also provided are methods of improving the rheology of a drilling fluid for drilling gas or oil wells, comprising modifying the drilling fluid with the subject rheology modifying additive described herein.

The following examples are set forth merely to further illustrate the subject rheology modifying additive. The illustrative examples should not be construed as limiting the subject matter in any manner.

Drilling Fluid #1 was prepared according to the composition and mixing time described in Table 1:

TABLE 1

| Material | Amount | | Mixing Time (minutes) |
|---|---|---|---|
| Diesel #2 | 218 | ml | 0 |
| CLAYTONE II | 8 | g | 5 |
| Lime | 3 | g | 5 |
| Emulsifier | 4 | g | 5 |
| 25% CaCl$_2$ brine | 79 | ml | 20 |
| Barite | 150 | g | 20 |
| Drill cuttings | 20 | g | 5 |
| High Sheer | 6,000 | rpm | 5 |

Drilling Fluid #2 was prepared according to the composition and mixing time described in Table 2:

TABLE 2

| Material | Amount | | Mixing Time (minutes) |
|---|---|---|---|
| Mineral Oil | 218 | ml | 0 |
| CLAYTONE-3 | 8 | g | 5 |
| Lime | 3 | g | 5 |
| Emulsifier | 4 | g | 5 |
| 25% CaCl$_2$ brine | 79 | ml | 20 |
| Barite | 150 | g | 20 |
| Drill cuttings | 20 | g | 5 |
| High Sheer | 6,000 | rpm | 5 |

Each Example and Comparative Example (collectively referred to as "samples") described below with regard to Drilling Fluid #1 and Drilling Fluid #2 were prepared and tested as described herein and according to API RP 13B-2, "Recommended Practice for Field Testing of Oil-based Drilling Fluids", Fifth Edition, which is incorporated herein by reference. The Emulsifier used in Drilling Fluid #1 and Drilling Fluid #2 was an about 70% active blend of modified tall oil derivatives. The Mineral Oil used in Drilling Fluid #2 was a low aromatic mineral oil. The "Drill cuttings" used in Drilling Fluid #1 and Drilling Fluid #2 were simulated drill cuttings, specifically an "OCMA Clay"; this material is commonly used to simulate drill cuttings in a laboratory setting (such as for purposes of standardization), as opposed to real drill cuttings which may vary in composition and particle size distribution. The "Barite" used in Drilling Fluid #1 and Drilling Fluid #2 was "API Barite" having a specific gravity of about 4.1.

After mixing was complete, each Example and Comparative Example were placed in a Thermo cup of a Model 900 Viscometer ("Viscometer") from OFI Testing Equipment, Inc., and run at 600 rpm until the target temperature of 120° F. or 150° F., as described below, was reached. Once this temperature was reached, rheology characteristics were measured using the Viscometer at 600, 300, 200, 100, 6 and 3 rpm, in order to obtain a rheology profile of each sample. It is noted that the Viscometer's output is in "dial readings" at a given rpm, which may be converted to centipoise, but the industry standard is to merely utilize the dial readings for simplicity.

The plastic viscosity ("PV") of each sample was then calculated by subtracting the measurement at 300 rpm from the measurement at 600 rpm. The yield point ("YP") of each sample was also calculated, by subtracting the PV from the measurement at 300 rpm. The gel strength ("GS") is the maximum deflection (dial reading) taken at 3 rpm after a period of rest. Gel strengths were measured for each sample after 10 seconds and 10 minutes of rest. Electrical stability ("ES") of each sample was also measured using a FANN® 32E electrical stability tester (available from the Fann Instrument Company, Houston, Tex.) which measures how much current (in volts) is required to create an arc in the drilling fluid sample. A higher number indicates greater emulsion stability of the drilling fluid.

After initial measurements were taken, each of the Examples and Comparative Examples were split in half. One half of each sample was hot-rolled at 150° F. for 16 hours, while the other half was hot-rolled at 250° F. for 16 hours. After hot-rolling, each half-sample was allowed to cool to room temperature, mixed for 5 minutes with enough rpm to create a small vortex, transferred to the thermocup of the Viscometer, and subjected to the same testing as was each sample prior to hot-rolling, as described above. Measurements and calculations for each half-sample were taken as described in the initial testing described above.

With respect to Example 21, after testing the half-samples which were hot rolled at 150° F. or 250° F., the half-samples were recombined, and hot rolled for an additional 16 hours at 300° F. This sample was then tested as described above.

Each Example and Comparative Example were prepared using either Drilling Fluid #1 or Drilling Fluid #2. If a rheology modifying additive was used in an Example or Comparative Example using Drilling Fluid #1, it was added to the drilling fluid prior to addition of the emulsifier and subsequent mixing. If an additive was used in an Example or Comparative Example using Drilling Fluid #2, it was added to the drilling fluid prior to addition of the brine and subsequent mixing. Table 3 lists the Examples and Comparative Examples made using Drilling Fluid #1, and includes the additive amount used (in lb/bbl), if any, and the temperature at which the Example or Comparative Example was tested in the Viscometer.

TABLE 3

| Additive | | | |
|---|---|---|---|
| Ex. # | FC or Chemistry | Amount | Temp. |
| Comp. 1 | None | N/A | 150° F. |
| Comp. 2 | None | N/A | 150° F. |
| Comp. 3 | None | N/A | 150° F. |
| Comp. 4 | None | N/A | 150° F. |
| 5 | A | 0.5 | 150° F. |
| 6 | A | 2.0 | 150° F. |
| 7 | B | 0.5 | 150° F. |
| 8 | B | 2.0 | 150° F. |
| Comp. 9 | Dimer/Trimer Fatty Acid | 0.5 | 150° F. |
| Comp. 10 | Dimer/Trimer Fatty Acid | 2.0 | 150° F. |
| Comp. 11 | Polymerized, Oxidized Tall Oil | 0.5 | 150° F. |
| Comp. 12 | Polymerized, Oxidized Tall Oil | 2.0 | 150° F. |
| Comp. 13 | Stearic Acid | 1.0 | 150° F. |
| Comp. 14 | Stearic Acid | 3.0 | 150° F. |

TABLE 3-continued

| Additive | | | |
|---|---|---|---|
| Ex. # | FC or Chemistry | Amount | Temp. |
| Comp. 15 | Oleic Acid | 0.5 | 150° F. |
| Comp. 16 | Oleic Acid | 2.0 | 150° F. |
| Comp. 17 | None | N/A | 120° F. |
| Comp. 18 | None | N/A | 120° F. |
| 19 | C | 0.5 | 120° F. |
| 20 | C | 2.0 | 120° F. |

Table 4 lists the Examples and Comparative Examples made using Drilling Fluid #2, and includes the additive amount used, if any, and the temperature at which the Example or Comparative Example was tested in the Viscometer.

TABLE 4

| Additive | | | |
|---|---|---|---|
| Ex. # | FC or Chemistry | Amount | Temp. |
| 21 | C | 0.5 | 150° F. |
| Comp. 22 | None | N/A | 150° F. |

Additive A comprised an about 50 weight percent solution of the subject rheology modifying additive in a mixture of 9 parts heavy hydrodesulfurized naphtha petroleum to 1 part butylglycol as a carrier/solvent.

Additive B comprised an about 50 weight percent solution of the subject rheology modifying additive in light aromatic solvent naphtha petroleum as a carrier/solvent.

Additive C comprised an about 60 weight percent solution of the subject rheology modifying additive in propylene glycol as a carrier/solvent.

Table 5 lists the results of Viscosity testing as described above for Comparative Examples 1 through 4, as well as the average of the testing of each Comparative Example at each hot-rolling temperature.

TABLE 5

| Ex. # | Hot-Rolling | Dial Reading at Listed rpm | | | | | | PV | YP | GS | | ES |
|---|---|---|---|---|---|---|---|---|---|---|---|---|
| | | 600 | 300 | 200 | 100 | 6 | 3 | | | 10" | 10' | |
| Comp. 1 | None | 55 | 35 | 27 | 19 | 8.9 | 8.3 | 20 | 15 | 8 | 9 | 564 |
| Comp. 2 | None | 59 | 40 | 30 | 22 | 11.2 | 10.3 | 19 | 21 | 9 | 10 | 598 |
| Comp. 3 | None | 53 | 35 | 27 | 18 | 8.4 | 7.5 | 18 | 17 | 8 | 10 | 309 |
| Comp. 4 | None | 57 | 36 | 27 | 20 | 8.9 | 8.1 | 21 | 15 | 8 | 10 | 500 |
| Average | None | 56 | 37 | 28 | 20 | 9.4 | 8.6 | 20 | 17 | 8 | 10 | 493 |
| Comp. 1 | 150° F. | 63 | 43 | 33 | 24 | 12.1 | 11.3 | 20 | 23 | 10 | 11 | 627 |
| Comp. 2 | 150° F. | 63 | 42 | 32 | 24 | 11.7 | 11.0 | 21 | 21 | 11 | 11 | 627 |
| Comp. 3 | 150° F. | 67 | 45 | 35 | 26 | 13.7 | 13 | 22 | 23 | 13 | 13 | 725 |
| Comp. 4 | 150° F. | 63 | 43 | 32 | 23 | 12.1 | 11.2 | 20 | 23 | 11 | 11 | 631 |
| Average | 150° F. | 64 | 43 | 33 | 24 | 12.4 | 11.6 | 21 | 23 | 11 | 12 | 653 |
| Comp. 1 | 250° F. | 66 | 43 | 32 | 23 | 11.2 | 10.1 | 23 | 20 | 10 | 10 | 593 |
| Comp. 2 | 250° F. | 68 | 45 | 34 | 24 | 11.3 | 10.6 | 23 | 22 | 11 | 11 | 670 |
| Comp. 3 | 250° F. | 65 | 41 | 32 | 23 | 10.7 | 9.5 | 24 | 17 | 9 | 9 | 657 |
| Comp. 4 | 250° F. | 64 | 42 | 32 | 23 | 10.7 | 10.1 | 22 | 20 | 10 | 10 | 662 |
| Average | 250° F. | 66 | 43 | 33 | 23 | 11.0 | 10.1 | 23 | 20 | 10 | 10 | 646 |

Table 6 lists the results of the Viscosity testing as described above for Examples 5 and 6, compared with the averages of Comparative Examples 1 through 4 ("C 1-4").

TABLE 6

| Ex. # | Hot-Rolling | 600 | 300 | 200 | 100 | 6 | 3 | PV | YP | GS 10" | 10' | ES |
|---|---|---|---|---|---|---|---|---|---|---|---|---|
| C 1-4 | None | 56 | 37 | 28 | 20 | 9.4 | 8.6 | 20 | 17 | 8 | 10 | 493 |
| 5 | None | 69 | 49 | 37 | 28 | 14.6 | 13.9 | 20 | 29 | 15 | 19 | 748 |
| 6 | None | 85 | 63 | 53 | 42 | 28.4 | 27.2 | 22 | 41 | 29 | 34 | 1159 |
| C 1-4 | 150° F. | 64 | 43 | 33 | 24 | 12.4 | 11.6 | 21 | 23 | 11 | 12 | 653 |
| 5 | 150° F. | 69 | 50 | 40 | 30 | 17.8 | 17.4 | 19 | 31 | 17 | 19 | 812 |
| 6 | 150° F. | 81 | 54 | 43 | 33 | 21.8 | 21.6 | 27 | 27 | 26 | 31 | 1147 |
| C 1-4 | 250° F. | 66 | 43 | 33 | 23 | 11.0 | 10.1 | 23 | 20 | 10 | 10 | 646 |
| 5 | 250° F. | 68 | 49 | 38 | 29 | 17.2 | 16.6 | 19 | 30 | 15 | 17 | 811 |
| 6 | 250° F. | 76 | 55 | 44 | 34 | 22.7 | 22.7 | 21 | 34 | 27 | 36 | 1221 |

Table 7 lists the results of the Viscosity testing as described above for Examples 7 and 8, compared with the averages of Comparative Examples 1 through 4 ("C 1-4").

TABLE 7

| Ex. # | Hot-Rolling | 600 | 300 | 200 | 100 | 6 | 3 | PV | YP | GS 10" | 10' | ES |
|---|---|---|---|---|---|---|---|---|---|---|---|---|
| C 1-4 | None | 56 | 37 | 28 | 20 | 9.4 | 8.6 | 20 | 17 | 8 | 10 | 493 |
| 7 | None | 66 | 46 | 37 | 28 | 14.5 | 13.2 | 20 | 26 | 15 | 20 | 642 |
| 8 | None | 84 | 61 | 51 | 40 | 23.6 | 22.3 | 23 | 38 | 24 | 36 | 934 |
| C 1-4 | 150° F. | 64 | 43 | 33 | 24 | 12.4 | 11.6 | 21 | 23 | 11 | 12 | 653 |
| 7 | 150° F. | 69 | 48 | 39 | 29 | 17.2 | 16.5 | 21 | 27 | 16 | 19 | 729 |
| 8 | 150° F. | 83 | 56 | 46 | 36 | 24.4 | 24.2 | 27 | 29 | 28 | 32 | 1093 |
| C 1-4 | 250° F. | 66 | 43 | 33 | 23 | 11.0 | 10.1 | 23 | 20 | 10 | 10 | 646 |
| 7 | 250° F. | 72 | 50 | 39 | 30 | 16.9 | 16 | 22 | 28 | 15 | 17 | 672 |
| 8 | 250° F. | 86 | 59 | 48 | 37 | 24.3 | 24.4 | 27 | 32 | 29 | 33 | 1116 |

These results show that, with small amounts of the subject rheology modifying additive incorporated, low shear values and yield points of the drilling fluid increased substantially, and greater amounts of the present additives increased the benefits even further. Furthermore, very little change occurred in the samples which were hot-rolled, showing that drilling fluids including the subject rheology modifying additive possess high thermal stability, which is confirmed by the ES measurements.

Table 8 lists the results of the Viscosity testing as described above for Comparative Examples 9 through 16.

TABLE 8

| Ex. # | Hot-Rolling | 600 | 300 | 200 | 100 | 6 | 3 | PV | YP | GS 10" | 10' | ES |
|---|---|---|---|---|---|---|---|---|---|---|---|---|
| C 9 | None | 55 | 36 | 27 | 19 | 8.1 | 7.4 | 19 | 17 | 7 | 10 | 644 |
| C 10 | None | 55 | 38 | 29 | 20 | 9.2 | 8.1 | 17 | 21 | 8 | 10 | 572 |
| C 11 | None | 55 | 36 | 27 | 19 | 8.1 | 7.4 | 19 | 17 | 7 | 10 | 64 |
| C 12 | None | 55 | 38 | 29 | 20 | 9.2 | 8.1 | 17 | 21 | 8 | 10 | 572 |
| C 13 | None | 66 | 46 | 35 | 26 | 13.1 | 12.4 | 20 | 26 | 12 | 14 | 559 |
| C 14 | None | 75 | 54 | 46 | 36 | 19.4 | 18.5 | 21 | 33 | 17 | 24 | 517 |
| C 15 | None | 55 | 36 | 27 | 19 | 8.0 | 7.2 | 19 | 17 | 7 | 9 | 639 |
| C 16 | None | 55 | 31 | 23 | 16 | 5.5 | 5.0 | 24 | 7 | 5 | 7 | 551 |
| C 9 | 150° F. | 64 | 48 | 38 | 29 | 17.5 | 17.1 | 16 | 32 | 17 | 20 | 729 |
| C 10 | 150° F. | 66 | 46 | 37 | 28 | 18.2 | 18.3 | 20 | 26 | 24 | 33 | 934 |
| C 11 | 150° F. | 63 | 46 | 35 | 26 | 13.1 | 12.4 | 20 | 26 | 12 | 14 | 559 |
| C 12 | 150° F. | 62 | 41 | 31 | 23 | 10.8 | 9.9 | 21 | 20 | 10 | 10 | 631 |
| C 13 | 150° F. | 72 | 52 | 41 | 31 | 16.4 | 15.4 | 20 | 32 | 15 | 15 | 617 |
| C 14 | 150° F. | 78 | 58 | 50 | 38 | 22.0 | 21.0 | 20 | 38 | 19 | 20 | 510 |
| C 15 | 150° F. | 67 | 48 | 37 | 27 | 13.8 | 13.0 | 19 | 29 | 12 | 13 | 733 |
| C 16 | 150° F. | 62 | 43 | 33 | 24 | 11.4 | 10.8 | 19 | 24 | 10 | 11 | 658 |
| C 9 | 250° F. | 71 | 48 | 37 | 28 | 15.5 | 14.6 | 23 | 25 | 14 | 16 | 722 |
| C 10 | 250° F. | 63 | 39 | 30 | 21 | 11.6 | 11.5 | 24 | 15 | 13 | 25 | 831 |
| C 11 | 250° F. | 64 | 42 | 32 | 22 | 10.5 | 9.6 | 22 | 20 | 9 | 9 | 594 |
| C 12 | 250° F. | 54 | 34 | 25 | 17 | 6.9 | 6.3 | 20 | 14 | 6 | 6 | 470 |
| C 13 | 250° F. | 60 | 37 | 27 | 19 | 7.1 | 6.3 | 23 | 14 | 6 | 6 | 426 |
| C 14 | 250° F. | 48 | 26 | 18 | 11 | 2.5 | 2.2 | 22 | 4 | 2 | 3 | 301 |

TABLE 8-continued

| Ex. # | Hot-Rolling | Dial Reading at Listed rpm | | | | | | PV | YP | GS | | ES |
|---|---|---|---|---|---|---|---|---|---|---|---|---|
| | | 600 | 300 | 200 | 100 | 6 | 3 | | | 10" | 10' | |
| C 15 | 250° F. | 60 | 42 | 31 | 22 | 9.2 | 8.4 | 18 | 24 | 8 | 8 | 573 |
| C 16 | 250° F. | 52 | 33 | 24 | 16 | 5.7 | 5.2 | 19 | 14 | 5 | 6 | 456 |

Table 9 lists the results of Viscosity testing as described above for Comparative Examples 17 and 18, as well as the average of the testing of each Comparative Example at each hot-rolling temperature.

TABLE 9

| Ex. # | Hot-Rolling | Dial Reading at Listed rpm | | | | | | PV | YP | GS | | ES |
|---|---|---|---|---|---|---|---|---|---|---|---|---|
| | | 600 | 300 | 200 | 100 | 6 | 3 | | | 10" | 10' | |
| C 17 | None | 67 | 41 | 30 | 20 | 8.5 | 7.6 | 26 | 15 | 7 | 9 | 444 |
| C 18 | None | 62 | 35 | 26 | 17 | 6.1 | 5.6 | 27 | 8 | 5 | 6 | 443 |
| Average | None | 65 | 38 | 28 | 19 | 7.3 | 6.6 | 27 | 12 | 6 | 8 | 444 |
| C 17 | 150° F. | 70 | 46 | 35 | 24 | 10.7 | 9.6 | 24 | 22 | 9 | 10 | 482 |
| C 18 | 150° F. | 73 | 46 | 34 | 24 | 10.1 | 8.9 | 27 | 19 | 8 | 9 | 509 |
| Average | 150° F. | 72 | 46 | 35 | 24 | 10.4 | 9.3 | 26 | 21 | 9 | 10 | 496 |
| C 17 | 250° F. | 70 | 45 | 35 | 25 | 10.7 | 9.9 | 25 | 20 | 9 | 10 | 445 |
| C 18 | 250° F. | 69 | 43 | 34 | 24 | 10.2 | 9.2 | 26 | 17 | 9 | 9 | 499 |
| Average | 250° F. | 70 | 44 | 35 | 25 | 10.5 | 9.6 | 26 | 19 | 9 | 10 | 472 |

Table 10 lists the results of the Viscosity testing as described above for Examples 19 and 20, compared with the averages of Comparative Examples 17 and 18 ("C 17-18").

TABLE 10

| Ex. # | Hot-Rolling | Dial Reading at Listed rpm | | | | | | PV | YP | GS | | ES |
|---|---|---|---|---|---|---|---|---|---|---|---|---|
| | | 600 | 300 | 200 | 100 | 6 | 3 | | | 10" | 10' | |
| C 17-18 | None | 65 | 38 | 28 | 19 | 7.3 | 6.6 | 27 | 12 | 6 | 8 | 444 |
| 19 | None | 75 | 50 | 39 | 27 | 12.5 | 11.4 | 25 | 25 | 11 | 14 | 562 |
| 20 | None | 99 | 69 | 55 | 42 | 22.3 | 20.6 | 30 | 39 | 20 | 26 | 873 |
| C 17-18 | 150° F. | 72 | 46 | 35 | 24 | 10.4 | 9.3 | 26 | 21 | 9 | 10 | 496 |
| 19 | 150° F. | 78 | 51 | 40 | 28 | 13.8 | 13.2 | 27 | 24 | 13 | 19 | 596 |
| 20 | 150° F. | 98 | 63 | 50 | 37 | 20.7 | 21.2 | 35 | 28 | 30 | 49 | 1104 |
| C 17-18 | 250° F. | 70 | 44 | 35 | 25 | 10.5 | 9.6 | 26 | 19 | 9 | 10 | 472 |
| 19 | 250° F. | 80 | 54 | 41 | 29 | 14.9 | 14.2 | 26 | 28 | 14 | 18 | 636 |
| 20 | 250° F. | 96 | 63 | 50 | 37 | 22.1 | 22.1 | 33 | 30 | 27 | 47 | 1144 |

Table 11 lists the results of the Viscosity testing as described above for Example 21 and Comparative Example 22.

TABLE 11

| Ex. # | Hot-Rolling | Dial Reading at Listed rpm | | | | | | PV | YP | GS | | ES |
|---|---|---|---|---|---|---|---|---|---|---|---|---|
| | | 600 | 300 | 200 | 100 | 6 | 3 | | | 10" | 10' | |
| 21 | None | 58 | 40 | 31 | 24 | 13.5 | 12.2 | 18 | 22 | 14 | 20 | 543 |
| C 22 | None | 52 | 35 | 25 | 18 | 7.4 | 6.6 | 17 | 18 | 6 | 7 | 438 |
| 21 | 150° F. | 58 | 40 | 31 | 22 | 13.2 | 12.9 | 18 | 22 | 13 | 18 | 592 |
| C 22 | 150° F. | 49 | 32 | 24 | 16 | 7.2 | 6.1 | 17 | 15 | 6 | 7 | 482 |
| 21 | 250° F. | 57 | 41 | 32 | 24 | 14.8 | 14.4 | 16 | 25 | 14 | 19 | 665 |
| C 22 | 250° F. | 50 | 33 | 24 | 16 | 7.2 | 6.5 | 17 | 16 | 6 | 7 | 408 |
| 21 | 300° F. | 44 | 27 | 20 | 15 | 9.1 | 8.8 | 17 | 10 | 9 | 9 | 730 |

It has also been found that the subject rheology modifying additive may reduce weight-material sag (sometimes referred to as "barite sag", as barite is a conventional weighting agent ("weight material"), as described herein).

Weight-material sag is a known phenomenon which may occur in some drilling fluids and/or during some drilling operations. Weight-material sag is said to occur when a significant drilling fluid density variation is present, such as greater than about 0.5 lb$_m$/gal, and may occur when a drilling fluid including a weighting agent has remained uncirculated for a period of time in a directional drilling well. It has been recognized that weight-material sag is both a static and dynamic phenomenon, and may even occur when the drilling fluid is being circulated. Weight-material sag may cause loss of circulation events and jeopardize overall drilling objectives, and may be related to drilling operation conditions and/or drilling fluid properties (such as rheology).

The tendency for weight-material sag to occur in a particular drilling fluid may be measured by at least two methods: the Static Sag Factor ("SSF") and the Viscometer Sag Shoe Test ("VSST"). Drilling fluids with an SSF in the range of about 0.5 to about 0.53 may be less prone to weight-material sag than drilling fluids with an SSF greater than about 0.53. Similarly, a drilling fluid with a VSST in the range of about 0.0 to about 1.0 $lb_m$/gal may be less prone to weight material sag than a drilling fluid with a VSST of greater than about 1.0 $lb_m$/gal. Drilling fluid consumers may specify that a drilling fluid have an SSF and/or a VSST within these ranges. SSF and VSST may be characterized by the following formulas, in which "d" represents density:

SSF (unitless)=$d_{bottom}/(d_{top}-d_{bottom})$

VSST ($lb_m$/gal)=$0.833*(d_{final}-d_{initial})$

Drilling Fluid #3 was specifically formulated in a manner which was expected to produce weight-material sag, and was prepared according to the composition and mixing time described in Table 12:

TABLE 12

| Material | Amount | | Mixing Time (minutes) |
|---|---|---|---|
| Base Fluid | 218 | ml | 0 |
| Organoclay | 10 or 12 | lb/bbl | 0 |
| RMA | 0 or 2 | lb/bbl | 0 |
| Lime | 7 | lb/bbl | 10 |
| Emulsifier | 10 | lb/bbl | 5 |
| Filtration Control | 1 | lb/bbl | 5 |
| 25% CaCl$_2$ brine | 72.5 | ml | 20 |
| Barite | 183 | lb/bbl | 5 |
| Drill Cuttings | 20 | lb/bbl | 5 |
| High Sheer | 6,000 | rpm | 20 |

The base fluid was a fluid comprising hydrotreated light petroleum distillates. The organoclay was a high temperature stable organophilic hectorite. "RMA" was the subject rheology modifying additive. The emulsifier was a polyaminated fatty acid (EZ-MUL® NT, available from Halliburton). The filtration control was a crosslinked copolymer (PLIOLITE DF01, available from Weatherford International Ltd.). The "Drill cuttings" were simulated drill cuttings, specifically an "OCMA Clay"; this material is commonly used to simulate drill cuttings in a laboratory setting (such as for purposes of standardization), as opposed to real drill cuttings which may vary in composition and particle size distribution. The "Barite" was "API Barite" having a specific gravity of about 4.1.

Comparative Example 22 included 10 lb/bbl organoclay and no RMA. Comparative Example 23 included 12 lb/bbl organoclay and no RMA. Example 24 included 10 lb/bbl organoclay and 2 lb/bbl RMA.

The VSST of each of these samples was measured initially, in order to determine if the subject rheology modifying additive would provide a reduction in weight material sag immediately. The test used to determine VSST measurements is described in detail in "Field Monitoring of Weight-Material Sag", Bern, et al., AADE-10-DF-HO-25, American Association of Drilling Engineers, 2010, in the section entitled Dynamic Weight-Material Sag Test on page 4; this section of the article is incorporated by reference herein. VSST is also described in "Taming of the Show", Zamora, AADE-11-NTCE-44, American Association of Drilling Engineers, 2011. The formula provided above gives the VSST value based on these VSST measurements. Table 13 shows the initial VSST measurements for each sample:

TABLE 13

| Sample | VSST ($lb_m$/gal) |
|---|---|
| Comp. 22 | 4.20 |
| Comp. 23 | 1.49 |
| 24 | 3.63 |

These results indicate that the subject rheology modifying additive provides a significant reduction in weight material sag, without requiring high temperature or extended shearing conditions during manufacture of the drilling fluid. Without wishing to be limited by theory, it is believed that the subject rheology modifying additive is able to form a network with the organoclay, and possible with the weighting agent, without needing to provide as much shear as may be required when using conventional drilling fluid additives. A comparison between Comparative Example 23 and Example 24 shows that even adding additional organoclay cannot achieve results similar to those achieved by using the subject rheology modifying additive.

After this initial testing was completed, the samples were tested for SSF according to the API RP 13B-2 standard entitled "Recommended Practice for Field Testing of Oil-based Drilling Fluids, Fifth Edition, Includes Errata". SSF is also discussed in U.S. Pat. No. 6,861,393 B2, at column 7, lines 42-58. Accordingly, the samples were static-aged in an oven for 48 hours at about 350° F. in the vertical position. After static aging and removal of oil which had separated out at the top of each sample, the top, middle and bottom layers of each sample were removed. Each layer was mixed for five minutes prior to measuring its density at room temperature. These density measurements were used to calculate the SSF of each sample, as shown in Table 14:

TABLE 14

| Sample | SSF |
|---|---|
| Comp. 22 | 0.626 |
| Comp. 23 | 0.534 |
| 24 | 0.512 |

As mentioned above, a desirable range for SSF is 0.5 to 0.53. Comparative Example 22, having 10 lb/bbl organoclay and no RMA, had an SSF much higher than the desired range. In an attempt to compensate for this, Comparative Example 23 included 12 lb/bbl organoclay (and still no RMA), but failed to bring the SSF into the desired range, although the result may be close enough to the desired range to be suitable. Example 24, using the same amount of RMA (2 lb/bbl), instead of the additional 2 lb/bbl organoclay found in Comparative Example 23, brought the SSF into the desired range.

Both the initial and static-aged versions of Comparative Examples 22 and 23 and Example 24 were then subjected to Viscosity testing at 150° F. as described above with regard to Drilling Fluid #1 and Drilling Fluid #2. The results of this testing are shown in Table 15:

TABLE 15

| Ex. # | Static Aging | Dial Reading at Listed rpm | | | | | | PV | YP | GS | | ES |
|---|---|---|---|---|---|---|---|---|---|---|---|---|
| | | 600 | 300 | 200 | 100 | 6 | 3 | | | 10" | 10' | |
| C 22 | No  | 50  | 29 | 20 | 13 | 4.2  | 3.4 | 21 | 8  | 4  | 4  | 665 |
| C 22 | Yes | 49  | 28 | 18 | 12 | 3.4  | 2.5 | 21 | 7  | 3  | 3  | 628 |
| C 23 | No  | 54  | 34 | 25 | 17 | 6    | 5   | 20 | 14 | 5  | 6  | 672 |
| C 23 | Yes | 137 | 91 | 73 | 51 | 16   | 13  | 46 | 45 | 14 | 17 | 1041 |
| 24   | No  | 59  | 38 | 38 | 20 | 10.1 | 10  | 21 | 17 | 11 | 38 | 1128 |
| 24   | Yes | 61  | 42 | 33 | 25 | 13.9 | 13  | 19 | 23 | 16 | 24 | 813 |

These results show that adding an extra 2 lb/bbl organoclay, as in Comparative Example 23, drastically and undesirably impacted the rheological properties of the drilling fluid, while Example 24 provided beneficial improvements to the drilling fluid as compared to Comparative Example 22. As discussed above, it may be desirable to increase the low-shear viscosity of a drilling fluid and the YP of a drilling fluid, without significantly impacting the PV of the drilling fluid. Example 24 shows that the subject rheology modifying additive provides exactly this result, while Comparative Example 23 shows that merely adding extra organoclay results in increased PV, which would need to be mitigated using expensive additives in order to provide a workable drilling fluid.

It will be understood that the embodiments described herein are merely exemplary, and that one skilled in the art may make variations and modifications without departing from the spirit and scope of the invention. All such variations and modifications are intended to be included within the scope of the invention as described hereinabove. Further, all embodiments disclosed are not necessarily in the alternative, as various embodiments of the invention may be combined to provide the desired result.

What is claimed is:

1. A drilling fluid for drilling gas or oil wells comprising:
   at least one oleaginous base fluid;
   at least one inorganic thixotropic agent;
   at least one of water or brine;
   at least one emulsifier;
   optionally at least one wetting agent;
   optionally at least one material which imparts alkalinity in the drilling fluid;
   optionally at least one weighting material; and
   a rheology modifying additive;
   wherein the rheology modifying additive, prior to addition to the drilling fluid, comprises:
   (i) an amine salt of a trimer acid, the trimer acid having from about 30 to about 72 carbon atoms; and
   (ii) an amine salt of a monocarboxylic fatty acid, the monocarboxylic fatty acid having from about 6 to about 30 carbon atoms, optionally wherein the monocarboxylic fatty acid comprises at least one of: (a) at least one saturated carboxylic acid; or (b) at least one unsaturated carboxylic acid; and
   wherein, when the drilling fluid is subjected to hot rolling at 250° F. for 16 hours, followed by cooling to room temperature, and then is subjected to viscosity testing at 120° F. and/or 150° F., the drilling fluid with at least about 0.25 lb/bbl of the rheology modifying additive exhibits at least one of the following properties, when compared to the drilling fluid without the rheology modifying additive:
   (1) an increase in yield point of at least about 25%, or optionally at least about 30%, or further optionally at least about 40%, or further optionally at least about 50%; or
   (2) an increase in 6 rpm dial reading of at least about 25%, or optionally at least about 30%, or further optionally at least about 40%, or further optionally at least about 50%, or further optionally at least about 75%, or further optionally at least about 100%.

2. The drilling fluid of claim 1, wherein the trimer acid has from about 36 to about 72 carbon atoms, or optionally from about 36 to about 66 carbon atoms, or further optionally from about 42 to about 60 carbon atoms, or further optionally from about 48 to about 54 carbon atoms.

3. The drilling fluid of claim 1, wherein the trimer acid comprises at least one of trimers of hexadecatrienoic acid, α-linolenic acid, rumelenic acid, stearidonic acid, α-parinaric acid, β-parinaric acid, eicosatrienoic acid, eicosatetraenoic acid, eicosapentaenoic acid, heneicosapentaenoic acid, docosapentaenoic acid, docosahexaenoic acid, tetracosapentaenoic acid, tetracosahexaenoic acid (nisinic acid), α-eleostearic acid, β-eleostearic acid, catalpic acid, punicic acid, linoleic acid, 10E,12Z-octadeca-9,11-dienoic acid, γ-linolenic acid, pinolenic acid, α-calendic acid, β-calendic acid, jacaric acid, eicosadienoic acid, dihomo-γ-linolenic acid, podocarpic acid, arachidonic acid, bosseopentaenoic acid, docosadienoic acid, docosatetraenoic acid, docosapentaenoic acid, tetracosatetraenoic acid, tetracosapentaenoic acid, 5-dodecenoic acid, 7-tetradecenoic acid, palmitoleic acid, vaccenic acid, rumenic acid, paullinic acid, 15-docosenoic acid, 17-tetracosenoic acid, oleic acid, talloil fatty acid, elaidic acid, gondoic acid, mead acid, erucic acid, nervonic acid, myristoleic acid, sapienic acid, or combinations thereof.

4. The drilling fluid of claim 1, wherein the monocarboxylic fatty acid has from about 8 to about 26 carbon atoms, or optionally from about 12 to about 20 carbon atoms, or further optionally from about 16 to about 18 carbon atoms.

5. The drilling fluid of claim 1, wherein the monocarboxylic fatty acid is a tall oil fatty acid having from about 16 to about 22 carbon atoms, or optionally from about 16 to about 20 carbon atoms, or further optionally from about 16 to about 18 carbon atoms.

6. The drilling fluid of claim 1, wherein the monocarboxylic fatty acid comprises at least one of myristoleic acid, sapienic acid, linoleic acid, linoelaidic acid, α-linolenic acid, docosahexaenoic acid, abietic acid, pimaric acid, tall oil fatty acid, caprylic acid, pelargonic acid, capric acid, undecylic acid, lauric acid, tridecylic acid, myristic acid, pentadecylic acid, palmitic acid, margaric acid, stearic acid, nonadecylic acid, arachidic acid, heneicosylic acid, behenic acid, tricosylic acid, lignoceric acid, pentacosylic acid, cerotic acid, hexadecatrienoic acid, α-linolenic acid, rumelenic acid, stearidonic acid, α-parinaric acid, β-parinaric acid, eicosatrienoic acid, eicosatetraenoic acid, eicosapentaenoic acid, heneicosapentaenoic acid, docosapentaenoic acid, docosahexaenoic acid, tetracosapentaenoic acid, tetracosahexaenoic acid (nisinic acid), α-eleostearic acid, β-eleostearic acid, catalpic acid, punicic acid, linoleic acid, 10E,12Z-octadeca-9,11-dienoic acid, γ-linolenic acid, pinolenic acid, α-calendic acid, β-calendic acid, jacaric acid, eicosadienoic acid, dihomo-γ-linolenic acid, podocarpic acid, arachidonic acid, bosseopentaenoic acid, docosadienoic acid, docosatetraenoic acid, docosapentaenoic acid, tetracosatetraenoic acid, tetracosapentaenoic acid, 5-dodecenoic acid, 7-tetradecenoic acid, palmitoleic acid, vaccenic acid, rumenic acid, paullinic acid, 15-docosenoic acid, 17-tetracosenoic acid, oleic acid, elaidic acid, gondoic acid, mead acid, erucic acid, or nervonic acid.

7. The drilling fluid of claim 1, wherein the amine of the rheology modifying additive component (i) and/or component (ii) is a saturated or unsaturated monoamine having from about 3 to about 90 carbon atoms, or optionally from about 3 to about 54 carbon atoms, or further optionally from about 8 to about 37 carbon atoms, or further optionally from about 10 to about 24 carbon atoms, or further optionally from about 14 to about 20 carbon atoms.

8. The drilling fluid of claim 1, wherein the amine of the rheology modifying additive component (i) and component (ii) are the same.

9. The drilling fluid of claim 1, wherein the amine comprises a monoamine of the general formula (I):

wherein:
$R_1$ represents a saturated or unsaturated, linear or branched hydrocarbon group having from about 1 to about 30 carbon atoms, or optionally from about 6 to about 24 carbon atoms, or further optionally from about 8 to about 22 carbon atoms; and $R_2$ and $R_3$ are the same or different from each other and $R_1$, and represent hydrogen or saturated or unsaturated, linear or branched hydrocarbon groups having from about 1 to about 30 carbon atoms, or optionally from about 6 to about 24 carbon atoms, or further optionally from about 8 to about 22 carbon atoms, or further optionally from about 1 to about 7 carbon atoms, or further optionally from about 1 to about 4 carbon atoms, or further optionally from about 1 to about 2 carbon atoms.

10. The drilling fluid of claim 9, wherein the amine comprises a monoamine in which $R_1$ represents a saturated or unsaturated, linear or branched hydrocarbon group having from about 12 to about 20 carbon atoms, and $R_2$ and $R_3$ represent hydrogen.

11. The drilling fluid of claim 1, wherein the amine comprises at least one of n-propylamine, isopropylamine, n-butylamine, isobutylamine, amylamine, n-pentylamine, isopentylamine, hexylamine, 2-ethylhexylamine, octylamine, 6-methyl-2-heptaneamine, neopentylamine, decylamine, tridecylamine, octadecylamine, oleylamine, cocoyl amine, stearyl amine, tallo amine, soya amine, or mixtures of $C_8$-$C_{22}$ alkylamines.

12. The drilling fluid of claim 1, wherein the weight ratio of the rheology modifying additive component (i):component (ii) is from about 95:5 to about 5:95, or optionally from about 90:10 to about 10:90, or further optionally from about 80:20 to about 30:70, or further optionally from about 70:30 to about 50:50, or further optionally from about 65:35 to about 55:45.

13. The drilling fluid of claim 1, wherein the rheology modifying additive further comprises at least one additional material.

14. The drilling fluid of claim 13, wherein the at least one additional material comprises at least one of aliphatic hydrocarbons, aromatic hydrocarbons, araliphatic hydrocarbons, aliphatic alcohols, aromatic alcohols, araliphatic alcohols, glycols, glycol ethers, or alkylene carbonates.

15. The drilling fluid of claim 1, wherein the rheology modifying additive is present in the drilling fluid in an amount of from about 0.5 to about 6 lb/bbl, or optionally from about 0.5 to about 4 lb/bbl, or further optionally from about 0.5 to about 2 lb/bbl, or further optionally from about 0.5 to about 1.5 lb/bbl.

16. The drilling fluid of claim 1, wherein the at least one oleaginous base fluid comprises at least one of diesel oil, mineral seal oil, kerosene, fuel oil, white oil, or crude oil.

17. The drilling fluid of claim 1, wherein the at least one inorganic thixotropic agent comprises at least one organoclay of bentonite, montmorillonite, hectorite, attapulgite, illite, Fuller's earth, beidellite, saponite, sepiolite, vermiculite, or zeolites, optionally wherein the at least one organoclay is treated with at least one of: (i) at least one quaternary ammonium compound; or (ii) at least one phosphonium compound.

18. The drilling fluid of claim 1, wherein the brine comprises at least one halide of alkali or alkaline earth metals, or optionally wherein the brine comprises at least one of a formation brine; seawater; or an aqueous solution of at least one of sodium chloride, potassium chloride, sodium bromide, calcium chloride, glycols, glycerols, or combinations thereof.

19. The drilling fluid of claim 1, wherein the at least one emulsifier or optional wetting agent comprises at least one of alkali or alkaline earth metal salts of fatty acids, fatty acid derivatives, rosin acids, tall oil acids, synthetic emulsifiers, alkyl aromatic sulfonates, aromatic alkyl sulfonates, long chain sulfates, oxidized tall oils, carboxylated 2-alkyl imidazolines, imidazoline salts, amido amines, amide-imidoamines, alkoxy phenols, polyalkoxy alcohols, alkyl phenols, ether carboxylates, lecithins, high molecular weight alcohols, or polymer surfactants.

20. The drilling fluid of claim 1, wherein the at least one material which imparts alkalinity comprises at least one of alkaline or alkaline earth carbonates, alkaline oxides, or alkaline hydroxides, optionally wherein the at least one material which imparts alkalinity comprises lime.

21. The drilling fluid of claim 1, wherein the at least one weighting material comprises at least one of calcium carbonate, silicates, clays, barites, specular hematite, iron ores, siderite, ilmenite, or galena.

22. A method of improving the rheology of a drilling fluid for drilling gas or oil wells, comprising modifying the drilling fluid according to claim 1 with the rheology modifying additive defined therein.

* * * * *